United States Patent
Haddon et al.

(10) Patent No.: US 6,531,513 B2
(45) Date of Patent: *Mar. 11, 2003

(54) METHOD OF SOLUBILIZING CARBON NANOTUBES IN ORGANIC SOLUTIONS

(75) Inventors: Robert C. Haddon, Riverside, CA (US); Mark A. Hamon, Carlisle, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/795,588

(22) Filed: Feb. 28, 2001

(65) Prior Publication Data

US 2001/0016608 A1 Aug. 23, 2001

Related U.S. Application Data

(63) Continuation-in-part of application No. 09/409,296, filed on Sep. 29, 1999, now Pat. No. 6,187,823, and a continuation-in-part of application No. 09/409,787, filed on Sep. 30, 1999, now Pat. No. 6,368,569.
(60) Provisional application No. 60/102,909, filed on Oct. 2, 1998, and provisional application No. 60/102,787, filed on Oct. 2, 1998.

(51) Int. Cl.[7] .............................. B01F 17/00; B01F 3/08; C09K 3/00
(52) U.S. Cl. .................... 516/32; 117/921; 252/182.28; 423/460
(58) Field of Search ...................... 516/32; 252/182.28; 117/921; 423/460; 562/509; 564/123

(56) References Cited

U.S. PATENT DOCUMENTS

| | | | |
|---|---|---|---|
| 3,301,790 A | * 1/1967 | Fitch et al. | ................ 516/32 X |
| 3,479,299 A | * 11/1969 | Rivin et al. | ............. 423/460 X |
| 4,073,869 A | * 2/1978 | Kalnin | ................... 423/462 X |
| 5,560,898 A | 10/1996 | Uchida et al. | .............. 423/461 |
| 5,695,734 A | 12/1997 | Ikazaki et al. | .............. 423/461 |
| 5,698,175 A | 12/1997 | Hiura et al. | ............ 423/461 X |
| 5,716,708 A | 2/1998 | Lagow | ....................... 428/408 |
| 6,036,774 A | * 3/2000 | Lieber et al. | ........... 117/921 X |
| 6,187,823 B1 | * 2/2001 | Haddon et al. | ............... 516/32 |
| 6,203,814 B1 | * 3/2001 | Fisher et al. | ............ 423/460 X |
| 6,322,713 B1 | * 11/2001 | Choi et al. | ............. 423/460 X |
| 6,331,262 B1 | * 12/2001 | Haddon et al. | ......... 423/460 X |
| 6,368,569 B1 | * 4/2002 | Haddon et al. | ............. 423/460 |

OTHER PUBLICATIONS

J. Liu et al. "Controlled Deposition of Individual Single–Walled Carbon Nano–Tubes on Chemically Functionalized Templates", Chemical Physics Letters 303: 125–129, Apr. 1999.*

B. Tang et al. "Preparation, Alignment, and Optical Properties of Soluble Poly (Phenylacetylene)–Wrapped Carbon Nanotubes", Macromolecules, 3 2(8) 2569–2576, Mar. 1999.*

C. Journet et al. "Large–Scale Production of Single–Walled Carbon Nano–Tubes by the Electric–Arc Technique", Nature 388, 756–758, Aug. 1997.*

T.W. Ebbesen "Cones and Tubes: Geometry in the Chemistry of Carbon", Acc. Chem. Res. 1998, 31, 558–566, 1998.*

Y. Chen et al. "Chemical Attachment of Organic Functional Groups to Single–Walled Carbon Nanotube Material", J. Mater. Res, vol. 13, No. 9, pp 2423–2431, Sep. 1998.*

B. Yokobson et al. "Fullerene Nanotubes: C1,000,000 and Beyond", American Scientist, pp. 324–337, Jul.–Aug. 1997.*

E. Dujardin et al. "Purification of Single–Shell Nanotubes", Adv. Mater. 1998, 10, No. 8, pp. 611–613, 1998.*

Chen, J. et al., Solution Properties of Single–Walled Carbon Nanotubes; Science 1998, 282, 95–98.

Hamon, M .A. et al., Dissolution of Single–Walled Carbon Nanotubes. Adv. Mater, 1999, 11, 834–840.

Liu, J. et al., Fullerene Pipes. Science 1998, 280, 1253–1255.

Rinzler, A. G. et al., Large–Scale Characterization. Appl. Phys. A 1998, 67, 29–37.

Rodham, D. A. et al., Hydrogen Bonding in the Benzene–Ammonia Dimer. Nature 1993, 362, 735–737.

Fleming, R. M. et al., Diffraction Symmetry in Crystalline, Close–Packed C60. Mater. Res. Soc. Symp. Proc. 1991, 206, 691.

Fleming, R. M. et al., Pseudotenfold Symmetry in Pentane–Solvated C60 and C70. Phys. Rev. B 1991, 44, 888–891.

Ruoff, R. S. et al., Anomalous Solubility Behaviour of C60. Nature 1993, 362, 140–141.

Ruoff, R. S. et al., Solubility of C60 in a Variety of Solvents. J. Phys. Chem. 1993, 97, 3379–3383.

Korobov, M. V. et al., C60 Bromobenzene Solvate: Crystallographic and Thermochemical Studies and Their Relationship to C60 Solubility in Bromobenzene. J. Phys. Chem. B 1998, 102, 3712–3717.

Korobov, M. V. et al., Calorimetric Studies of Solvates of C60 and C70 with Aromatic Solvents. J. Phys. Chem. B 1999, 103, 1339–1346.

* cited by examiner

*Primary Examiner*—Richard D. Lovering
(74) *Attorney, Agent, or Firm*—King & Schickli, PLLC

(57) ABSTRACT

Carbon nanotubes are dissolved in organic solutions by attaching an aliphatic carbon chain (which may contain aromatic residues) so as to render the carbon nanotubes soluble.

8 Claims, No Drawings

METHOD OF SOLUBILIZING CARBON NANOTUBES IN ORGANIC SOLUTIONS

This application is a continuation-in-part of U.S. patent application Ser. No. 09/409,296 filed Sep. 29, 1999, now U.S. Pat. No. 6,187,823, and of U.S. patent application Ser. No. 09/409,787 filed Sep. 30, 1999, now U.S. Pat. No. 6,368,569, which claim the benefit of Provisional Patent Application Serial Nos. 60/102,909 and 60/102,787 filed Oct. 2, 1998. This invention was made with Government support under NSF-EPSCOR grant EPS 9452895. The Government may have certain rights in this invention.

Technical Field

The present invention relates to the dissolution of full length or, unshortened carbon nanotubes in solutions and more particularly, to a method of dissolving carbon metals and semiconductors in organic solutions.

BACKGROUND OF THE INVENTION

All previous work on carbon nanotubes (both single-walled and multi-walled) has been carried out on the usual intractable, insoluble form of this material [Yakobson, B. I.; Smalley, R. E., Fullerene Nanotubes: C1,000.000 and Beyond. American Scientist 1997, 85, 324–337.] This form of the material is not amenable to many of the processing steps that are necessary if the carbon nanotubes (CNTs) are to reach their full potential—particularly in applications that require these materials in the form of polymers, copolymers, composites, ceramics and moldable forms.

While present forms of the CNTs can be heterogeneously dispersed in various media, the interactions between the CNTs and host and between the CNTs themselves are simply physical, and without the formation of chemical bonds. Thus, the advantageous properties of the CNTs are unlikely to be realized on a macroscopic level. What is needed is a method to prepare well-dispersed forms of CNTs perhaps by inducing them to exfoliate from the bundles and dissolve in organic solvents. Although long believed to be impossible, [Ebbesen, T. W., Cones and Tubes: Geometry in the Chemistry of Carbon. Acc. Chem. Res. 1998, 31, 558–566] we now teach such a procedure for the dissolution of all types of CNTs [Chen, J.; Hamon, M. A.; Hu, H.; Chen, Y.; Rao, A. M.; Eklund, P. C.; Haddon, R. C., Solution Properties of Single-Walled Carbon Nanotubes. Science 1998, 282, 95–98; Hamon, M. A.; Chen, J.; Hu, H.; Chen, Y.; Rao, A. M.; Eklund, P. C.; Haddon, R. C., Dissolution of Single-Walled Carbon Nanotubes. Adv. Mater. 1999, 11, 834–840].

SUMMARY OF THE INVENTION

In accordance with the present invention, a simple method of solubilizing carbon nanotubes is provided. The resulting solutions are anticipated to be useful in the functionalization chemistry of the ends, the exterior walls or convex face and the interior cavity or concave face of carbon nanotubes and processing useful nanotube based polymer, copolymer and composite products and devices for a multitude of applications in various industries including aerospace, battery, fuel cell, healthcare and electromagnetic radiation shielding.

Advantageously, as a result of the present invention, functionalization chemistry of the CNTs can be achieved through the study of both the ionic and covalent solution phase chemistry with concomitant modulation of the single wall nanotube band structure.

Additional advantages and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a novel and improved method of dissolving CNT metals and semiconductors in common organic solutions is provided. The method comprises the attaching of an aliphatic carbon chain (which may contain organic residues) to the CNTs so as to render the CNTs soluble in the selected organic solvent.

The attaching step includes directly reacting the carbon nanotubes with an amine having a formula $RNH_2$ or $R_1R_2NH$ wherein R, $R_1$ and $R_2=(CH_2)_nCH_3$ where n=9–50. Alternatively, the attaching step includes directly reacting the carbon nanotubes with an alkylaryl amine having a formula $RNH_2$ Or $R_1R_2NH$ wherein R, $R_1$ and $R_2=(C_6H_4)(CH_2)_nCH_3$ where n=5–50.

In accordance with yet another aspect of the invention, the attaching step includes the steps of (a) mixing the carbon nanotubes with an amine or alkylaryl amine having a formula $RNH_2$ or $R_1R_2NH$ wherein R, $R_1$ and $R_2=(CH_2)_nCH_3$ and n=9–50 or R, $R_1$ and $R_2=(C_6H_4)(CH_2)_nCH_3$ and =5–50; and (b) heating the resulting mixture to a temperature between 50–200° C. More preferably, the heating step is to 60–100° C. for at least 70 hours.

The method may also be described as including the further step of dissolving the resulting carbon nanotubes with attached aliphatic carbon chain in the selected organic solvent. That organic solvent may be an aromatic or chlorinated solvent. Solvents in which the CNTs of the present invention may be solubilized include but are not limited to chlorobenzene, dichlorobenzene, trichlorobenzene, tetrahydrofuran, chloroform, methylene chloride, diethylene glycol dimethyl ether, carbon disulfide, benzene, toluene, tetrachlorocarbon, pyridine, dichloroethane, diethyl ether, xylene, naphthalene, nitrobenzene, ether and mixtures thereof. The solubilities of the carbon nanotubes in these solvents range from about 0.01–5.0 mg/ml.

Advantageously, such a solution not only allows the study of the functionalization chemistry of the open ends, the exterior walls or convex face and the interior cavity or concave face of the nanotubes, but also processing of the nanotubes into useful products for various applications including as intermediates in the preparation of polymer, copolymer and composite materials.

In the following description, there are shown and described various embodiments of this invention, simply by way of illustration of several modes and alternate embodiments best suited to carry out the invention. As it will be realized, the invention is capable of still other and different embodiments, and its several details are capable of modifications in various, obvious aspects all without departing from the invention. Accordingly, the descriptions will be regarded as illustrative in nature and not as restrictive.

DETAILED DESCRIPTION OF THE INVENTION

In the novel method of the present invention, we begin with raw, as prepared, CNT soot (AP-CNTs). The AP-CNTs come in two basic forms: AP-single-walled carbon nanotubes (AP-SWNTs) available from CarboLex, Inc. of Lexington, Ky. and AP-multi-walled carbon nanotubes (AP- MWNTs) available from MER Corporation of 7960 South Kolb Rd, Tucson, Ariz. 85706. The AP-SWNTs are prepared by use of an electric arc technique similar to that described by Journet, C.; Maser, W. K.; Bernier, P.; Loiseau, A.; Lamy de la Chappelle, M.; Lefrant, S.; Deniard, P.; Lee, R. and Fischer, J. E., in Large Scale Production of Single-Walled Carbon Nanotubes by the Electric-Arc Technique. Nature 1997, 388, 756–758. The estimated purity of this material is 40–60% SWNT by volume. Batches of 10 grams may be prepared in a single run and there is considerable scope for further increase in scale. Thus it is possible to contemplate the very large-scale production of this material in the future. The AP-MWNTs are of an estimated purity of less than 10% and the nanotubes are of poor quality with many defective and fused together CNTs. We describe herein routes to soluble CNTs, starting from AP-SWNTs and AP-MWNTs.

In accordance with the present invention, full length or unshortened carbon nanotubes are solubilized. This is accomplished utilizing a simple procedure which advantageously preserves the length of the carbon nanotubes which is one of their primary attractions in many applications.

In a prior art approach described in copending U.S. patent application Ser. No. 09/409,787 filed on Sep. 30, 1999 now U.S. Pat. No. 6,368,569, and entitled "Method of Solubilizing Unshortened Carbon Nanotubes In Organic Solutions", there are basically two steps in all of the procedures: (1) a pretreatment, or purification step that serves to add carboxylic acid functionalities to the nanotubes and (2) a chemical functionalization step that modifies the carboxylic acid in a way that attaches a long aliphatic carbon chain to the end of the nanotube, and thereby renders the CNTs soluble in some organic solvents.

We have now found a way to simplify this process so that the introduction of carboxylic acid groups is not necessary. This has been achieved through the direct (noncovalent) interaction of the SWNTs with a long chain amine such as octadecylamine (ODA). One of the major advantages of this method is its simplicity and ease of use. The CNTs do not require any pre-treatment. The AP-CNTs are used directly in the dissolution step. Furthermore, the CNTs are not subjected to strong acid, and extra functionality is not introduced. IR spectroscopy of these CNTs, either before or after dissolution, shows no evidence for the functional groups that are usually introduced by the acids used in the purification. [Chen, J.; Hamon, M. A.; Hu, H.; Chen, Y.; Rao, A. M.; Eklund, P. C.; Haddon, R. C., Solution Properties of Single-Walled Carbon Nanotubes. Science 1998, 282, 95–98; Liu, J.; Rinzler, A. G.; Dai, H.; Hafner, J. H.; Bradley, R. K.; Boul, P. J.; Lu, A.; Iverson, T.; Shelimov, K.; Huffman, C. B.; Rodriguez-Macias, F.; Shon, Y.-S.; Lee, T. R.; Colbert, D. T.; Smalley, R. E., Fullerene Pipes. Science 1998, 280, 1253–1255; Rinzler, A. G.; Liu, J.; Dai, H.; Nilolaev, P.; Huffman, C. B.; Rodriguez-Macias, F. J.; Boul, P. J.; Lu, A. H.; Heymann, D.; Colbert, D. T.; Lee, R. S.; Fischer, J. E.; Rao, A. M.; Eklund, P. C.; Smalley, R. E., Large-Scale Purification of Single-Wall Carbon Nanotubes: Process, Product and Characterization. Appl. Phys. A 1998, 67, 29–37.]

Furthermore, the CNTs may be liberated from the amine by acidification. Thus, treatment of solutions of the CNT [amine] solvate with hydrochloric acid leads to precipitation of the unchanged CNTs due to protonation of the amine. Hence, this method is an ideal way to introduce CNTs into polymer mixtures and blends and to form films, from which the amine may be easily removed because it is not chemically bonded to the CNTs.

The nature of the noncovalent and presumably nonionic long chain amine—CNT interaction is not fully understood at this point but could involve micelle formation with the head of the amine group interacting with the wall of the CNTs leading to a colloidal dispersion. This interaction would allow the amine to radiate out from the CNTs and create a micelle-like particle. These particles could then form colloidal solutions in organic solvents. In this scenario the dissolution process of AP-CNTs takes the form of a noncovalent interaction with the long-chain amine, which is presumably similar to the interaction of ammonia with benzene. [Rodham, D. A.; Suzuki, S.; Suenram, R. D.; Lovas, F. J.; Dasgupta, S.; Goddard III, W. A.; Blake, G. A., Hydrogen Bonding in the Benzene-Ammonia Dimer. Nature 1993, 362, 735–737.]

By means of the present invention, it is possible to directly attach an aliphatic carbon chain such as an amine or alkylarylamine to as-prepared carbon nanotubes and single walled carbon nanotubes produced by a modified electric arc discharge. This attachment is accomplished by mixing the single walled carbon nanotubes with an amine having a formula $RNH_2$ or $R_1R_2NH$ wherein R, $R_1$ and $R_2$=$(CH_2)_nCH_3$ where n=9–50 and/or an alkylarylamine having a formula $RNH_2$ or $R_1R_2NH$ wherein R, $R_1$ and $R_2$=$(C_6H_4)(CH_2)_nCH_3$ where n=5–50. The mixture of AP-CNTs or AP-SWNTs and amine and/or alkylarylamine is then heated to a temperature of 60–100° C. for at least 70 hours. Preferably the mixture is mildly agitated during this time to insure more complete reaction and to increase yields. As a result of this process amines and/or alkylarylamines are attached to some of the AP-CNTs or AP-SWNTs undergoing processing.

EXAMPLE 1

0.192 grams of AP-SWNTs were heated for 72 hours at 70° C. in 2.073 grams of octadecylamine. The black mixture was dissolved in tetrahydrofuran and filtered through coarse filter paper. The filtrate was then dried under vacuum. The solid single walled carbon nanotubes with attached octadecylamine ligand was collected on a membrane filter, (0.2 m pore size), washed with ethanol and dried. Mass recovered 0.077 grams.

EXAMPLE 2

The procedure of example 1 is repeated except that the temperature is raised to 100° C.

EXAMPLE 3

The procedure of example 1 is repeated except that the temperature is lowered to 60° C. and the processing time is extended to 100 hours.

EXAMPLES 4–36

The procedures of examples 1–3 are repeated except that molar equivalent amounts of nonylamine, dodecylamine, pentacosylamine, tetracontylamine, pentacontylamine, 4-pentylaniline, 4-dodecylaniline, 4-tetradocylaniline, 4-pentacosylaniline, 4-tetracontylaniline and/or 4-pentacontylaniline are substituted for octadecylamine.

The single walled carbon nanotubes with attached aliphatic carbon chain resulting from the present invention may be dissolved in a number of different organic solvents. Generally, aromatic or chlorinated solvents provide the best results with concentrations between 0.01–5.0 mg/ml solubilities being obtainable. Solvents in which solubility has been shown include but are not limited to chlorobenzene, dichlorobenzene, trichlorobenzene, tetrahydrofuran, chloroform, methylene chloride, diethylene glycol dimethyl ether, carbon disulfide, benzene, toluene, tetrachlorocarbon, pyridine, dichloroethane, diethyl ether, xylene, naphthalene, nitrobenzene, dichloroethane, ether and mixtures thereof.

In summary, the method of the present invention includes the preparation of solutions of naked full length or unshortened carbon nanotube metals and semiconductors in organic solutions which would allow both ionic (charge transfer) and covalent solution phase chemistry with concomitant modulation of the CNT band structure. It is now possible to obtain well-characterized, highly purified CNT materials which are suitable for physical property measurements. The CNTs have a rich chemistry at their ends, the exterior walls and the interior cavity. The CNTs are versatile precursors to copolymer materials with distinctive mechanical and electrical properties and are new ligands for metal complexation.

What is claimed is:

1. A method of solubilizing carbon nanotubes in a selected organic solvent, comprising:

attaching an aliphatic amine or alkylaryl amine to said carbon nanotubes; and dissolving said carbon nanotubes with said attached aliphatic amine or alkylaryl amine in said selected organic solvent.

2. The method of claim 1, wherein said carbon nanotubes are directly reacted with an alkylaryl amine having a formula $RNH_2$ or $R_1R_2NH$ wherein R, $R_1$ and $R_2=(C_6H_4)(CH_2)_n CH_3$ where n=5–50.

3. The method of claim 1 wherein said amine is selected from a group consisting of octadecylamine, nonylamine, dodecylamine, pentacosylamine, tetracontylamine, pentacontylamine, 4-pentylaniline, 4-dodecylaniline, 4-tetradocylaniline, 4-pentacosylaniline, 4-tetracontylaniline, 4-pentacontylaniline and mixtures thereof.

4. The method of claim 1, wherein said selected organic solvent is selected from a group consisting of chlorobenzene, dichlorobenzene, trichlorobenzene, tetrahydrofuran, chloroform, methylene chloride, diethylene glycol dimethyl ether, carbon disulfide, benzene, toluene, tetrachlorocarbon, pyridine, dichloroethane, diethyl ether, xylene, naphthalene, nitrobenzene, ether and mixtures thereof.

5. The method of claim 1, wherein said carbon nanotubes are directly reacted with an aliphatic amine having a formula $RNH_2$ or $R_1R_2NH$ wherein R, $R_1$ and $R_2=(CH_2)_n CH_3$ where n=9–50.

6. The method of claim 5, wherein said amine is octadecylamine.

7. The method of claim 1, wherein said attaching step includes:

(a) mixing said carbon nanotubes with an amine or alkylaryl amine having the formula $RNH_2$ or $R_1R_2NH$ wherein R, $R_1$ and $R_2=(CH_2)_n CH_3$ and n=9–50 or R, $R_1$ and $R_2=(C_6H_4)(CH_2)_n CH_3$ and n=5–50; and (b) heating the resulting mixture to a temperature between 50–200° C.

8. The method of claim 7, wherein said heating step is to 60–100° C. for at least 70 hours.

* * * * *